(12) United States Patent
Kanan

(10) Patent No.: US 6,199,648 B1
(45) Date of Patent: Mar. 13, 2001

(54) FLOATATION AND SNOW EXCLUSION COMPONENTS FOR A SUSPENSION SYSTEM FOR A SNOWMOBILE

(76) Inventor: Ronald C. Kanan, 917 E. Hyman, Aspen, CO (US) 81611

( * ) Notice: Subject to any disclaimer, the term of this patent is extended or adjusted under 35 U.S.C. 154(b) by 0 days.

(21) Appl. No.: 09/443,955

(22) Filed: Nov. 19, 1999

Related U.S. Application Data

(63) Continuation-in-part of application No. 08/979,753, filed on Nov. 26, 1997, now Pat. No. 6,039,136.

(51) Int. Cl.[7] .................................................. B62M 27/00
(52) U.S. Cl. .............................................................. 180/182
(58) Field of Search ................................... 180/182, 183, 180/184, 185

(56) References Cited

U.S. PATENT DOCUMENTS

| | | |
|---|---|---|
| 871,907 | 11/1907 | Bertram . |
| 1,213,715 | * 1/1917 | Weinberg . |
| 2,735,690 | 2/1956 | Paden et al. . |
| 3,482,849 | 12/1969 | Puetz . |
| 3,596,727 | * 8/1971 | Graham ................................. 180/185 |
| 3,645,347 | 2/1972 | Brant . |
| 3,719,369 | 3/1973 | Savage . |
| 3,841,649 | * 10/1974 | McMullen ............................... 280/16 |
| 4,291,892 | 9/1981 | Berthold et al. . |
| 4,390,151 | 6/1983 | Schneider . |
| 4,393,953 | 7/1983 | Boulianne . |
| 4,620,604 | 11/1986 | Talbot . |
| 4,671,521 | 6/1987 | Talbot et al. . |
| 5,109,941 | * 5/1992 | Thompson ............................ 180/182 |

* cited by examiner

Primary Examiner—Kevin Hurley
(74) Attorney, Agent, or Firm—Dorsey & Whitney LLP

(57) ABSTRACT

An improved suspension mechanism for snowmobiles. In particular, an additional set of skis which provide support and stability to a snowmobile when the snowmobile is in deep powder is described. The skis also provide an effective structure for preventing the build-up of snow and ice in the snowmobile's suspension wells. Additionally, a suspension well skirt which provides a barrier from snow for a snowmobile's suspension well is described. The additional skis, in conjunction with the skirt, allow a snowmobile to be propelled quickly through deep snow as well as provide increased steerability to the snowmobile when it is in deep snow.

32 Claims, 17 Drawing Sheets

FLOATATION AND SNOW EXCLUSION COMPONENTS FOR A SUSPENSION SYSTEM FOR A SNOWMOBILE

CROSS REFERENCE TO RELATED APPLICATIONS

This application is a continuation in part of U.S. patent application Ser. No. 08/979,753, filed on Nov. 26, 1997 now U.S. Pat. No. 6,039,136.

FIELD OF THE INVENTION

The present invention relates to the field of suspension systems for snow vehicles. More particularly, the invention relates to an improved floatation component and to a snow exclusion component of the suspension system for a snowmobile, which results in improved performance and handling in deep snow.

BACKGROUND OF THE INVENTION

Snowmobiles have been a mode of transportation across snow for decades. Over the years there have been numerous general configurations for snowmobiles. Generally, a snowmobile comprises a tread on the rear part of the snowmobile which is driven by an engine, and two skis on the front of the snowmobile which support the front end of the snowmobile as well as provide steering for the snowmobile. The tread rotates around a series of suspension wheels and grips the snow thereby pushing the snowmobile in a forward or rearward direction. The tread acts in a similar manner to treads on a tank. The front of the snowmobile is supported by a pair of skis. There have been single ski snowmobiles, but the typical snowmobile has two skis. The skis generally are linked to a suspension system which absorbs the impact when a ski hits a hard surface, thus making the snowmobile more comfortable to ride and easier to handle. This type of snowmobile is generally shown in U.S. Pat. No. 5,109,941.

The front skis also provide steering for the snowmobile. The skis are secured through a variety of mechanical couplings to a handlebar which is gripped by the user. As the user turns the handlebar in one direction, the skis point in that direction and thus turn the snowmobile in that direction.

Oftentimes snowmobiling is done in very deep snow, which presents many problems to existing snowmobiles. The first problem is that even though the front skis lift the front of the snowmobile off the snow, in deep powder the front of the snowmobile can get bogged down. One reason for this is that snow packs into the suspension wells of the snowmobile when riding in deep powder, thus increasing front end resistance. This resistance causes difficulty in steering and cause the snowmobile to slow down or even become stuck. Another reason for the snowmobile getting stuck is that the front end of the snowmobile may simply sink in the deep snow, regardless of the increased resistance.

Attempts have been made to correct this problem by widening the front skis. An example of this is shown in U.S. Pat. No. 3,482,849. This is undesirable in that the steering precision can decrease as the skis are widened.

Another problem with having snow packed suspension wells is that snow and ice tend to interfere with a snowmobile's suspension system. The suspension wells allow the snowmobile's suspension components to move as needed through their normal range of motion without interference. However, the inside of the suspension well is typically the outer wall of the snowmobile's engine housing. The suspension well is heated-up during use due to emitted engine heat, and the snow then often turns to ice. As the ice builds up inside the suspension well more snow can become packed in the well. This combination of packed snow and ice formation can lead to fairly significant interference with the movement of the suspension system.

An additional problem with existing snowmobiles is that as they are driven in the deep snow, the steerability of the snowmobile diminishes significantly. This diminishment of steerability results from the front skis being buried in deep snow, and not being the sole point of contact between the front of the snowmobile and the snow. Rather, the bottom of the front of the snowmobile resists turning because it too is buried in deep snow.

There exists a need for a snowmobile to have additional support in deep snow that allows the snowmobile to maintain ideal speeds in deep snow. Additionally, there exists a need for a snowmobile that reduces or eliminates snow from entering the snowmobile's suspension wells.

It is with these shortcomings in mind that the present invention was developed.

SUMMARY OF THE INVENTION

The present invention is embodied in an additional component of a suspension system for a snowmobile. The present invention utilizes two additional skis secured below the front carriage or on the belly pan of the snowmobile. The additional skis assist the performance of the snowmobile in deep snow. The invention includes two or more individually mounted skis which during normal operation of the snowmobile across a flat packed snow surface, do not engage the snow surface. However, upon encountering deep snow, the additional skis assist in preventing snow from packing into the suspension wells of the snowmobile. The skis also support, and provide lift to, the front chassis of the snowmobile and allow the snowmobile to go through deep snow, while maintaining sufficient force on the front two primary skis to provide steerability of the snowmobile. The suspension mechanism of the present invention provides additional support to the front cowling of the snowmobile so it does not get stuck in deep powder.

The present invention also utilizes a suspension well skirt secured to the cowling along the perimeter of the suspension well and extending over each well opening. The skirt is secured to the cowling using snaps, Velcro®, or other like means. The skirt can hang freely over the well opening, be secured to the floatation skis of the present invention or be secured to the belly pan. The skirt can act alone or in conjunction with the skis to prevent snow and ice from entering the snowmobile suspension wells and thus provide maximal benefit for the snowmobile suspension system.

The foregoing and other features, utilities and advantages of the invention will be apparent from the following more particular description of a preferred embodiment of the invention as illustrated in the accompanying drawings.

DETAILED DESCRIPTION OF THE PREFERRED EMBODIMENT

Snowmobile suspension systems are ideally designed to provide suspension for the snowmobile across flat or lightly packed snow surfaces. However, typical suspension systems for snowmobiles do not adequately handle deep powder. The present invention is directed to a modification of presently available snowmobile suspension system such that travel through deep powder may be possible with greatly reduced disruption to the speed or steerability of the machine. Suspension, as used throughout, includes not only the moving linkages for absorbing shocks and steering, but also for supporting the front of the snowmobile on the snow. This includes the standard skis and the inventive floatation skis described herein.

Figure 1:
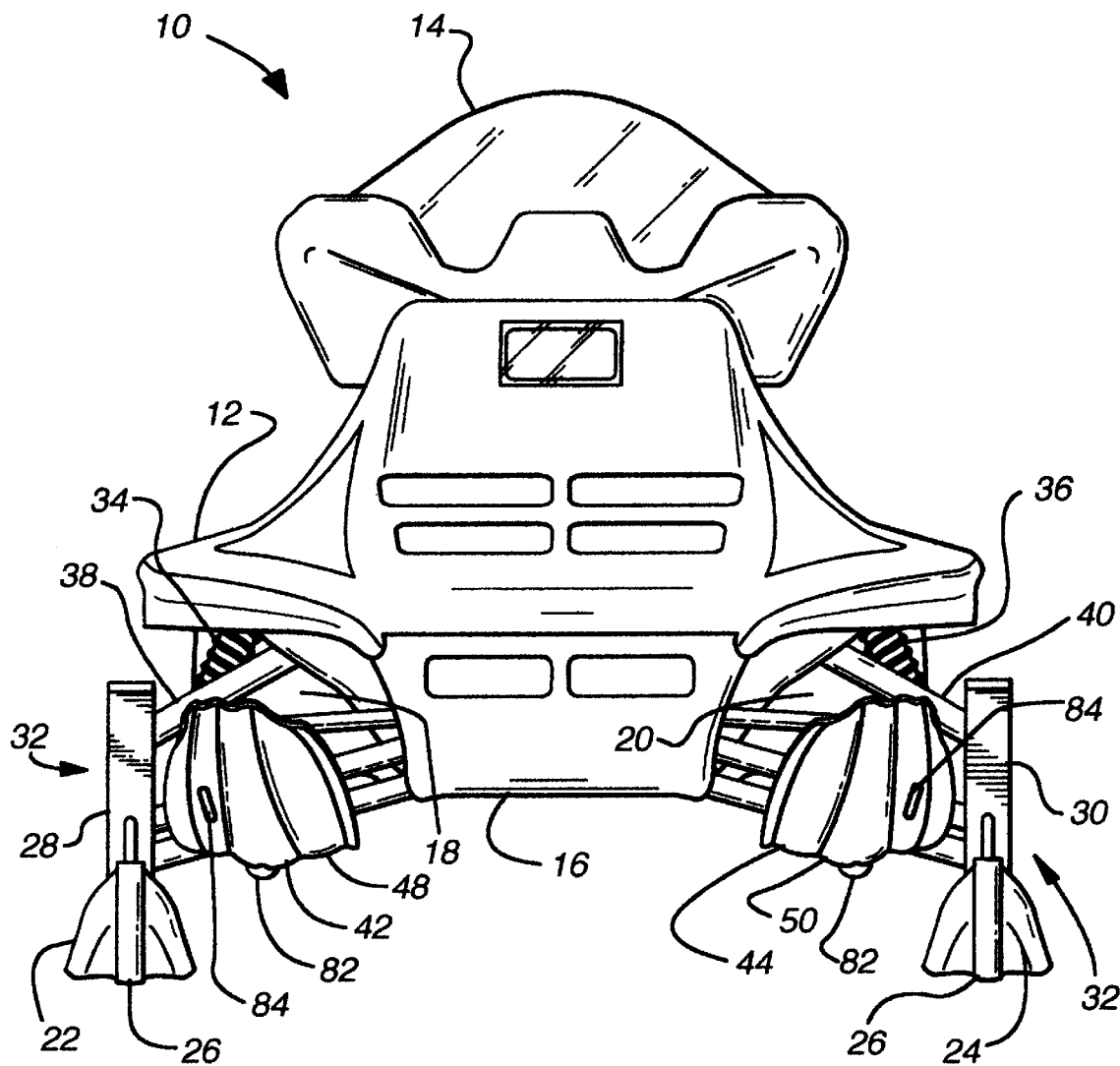
FIG. 1 is a front view of a snowmobile utilizing the floatation components of the suspension mechanism of the present invention.

A snowmobile viewed from the front end is generally shown as 10 in FIG. 1. Snowmobile 10 has a front cowling 12 which provides a variety of functions. The cowling 12 acts as a hood to cover the engine. The cowling 12 also provides protection from the wind for the riders as they are moving forward with the snowmobile. The cowling 12 also may provide support for lights, reflectors, and add to the overall styling of the snowmobile 10. The type or shape of the cowling 12 for the present invention is immaterial as far as the present invention is concerned. The cowling 12 is typically made of a stiff, durable polymeric or composite material.

Situated at the top of the cowling 12 is a windshield 14, which provides both wind resistance and safety to the driver of the snowmobile. The windshield 14 also is positioned in front of the handlebars (not pictured), which provide the steering control for the snowmobile 10. The windshield is typically a transparent shatterproof type of acrylic material.

The bottom 16 of the cowling 12 (also referred to as the belly pan) is a primary contact point where the snowmobile 10 might become bogged down in deep snow. Additionally, deep snow may also be compacted in the suspension wells, which are generally shown as 18 and 20 in FIG. 1.

Typical skis for present snowmobiles are shown as 22 and 24. These skis 22 and 24 are attached to the handlebars and provide steerability for the snowmobile 10, as well as support for the front end of the snowmobile 10 on the snow. The primary skis 22 and 24 are usually ribbed in a linear fashion to increase the handling characteristics of the snowmobile 10. Oftentimes the primary skis 22 and 24 include carbide runners 26 along their length to protect the bottoms from hard surfaces, such as rocks, pavement or the like. The skis 22 and 24 are secured to linkage brackets 28 and 30 respectively. The skis 22 and 24 as well as the linkage brackets 28 and 30 are generally referred to as 32. The linkage brackets 28 and 30 are secured to the shock-absorbing suspension of the snowmobile 10, which is partially shown as 34 and 36.

The suspension system shown in the attached drawings is just one example of a suspension system that could be used for the present invention. The type of suspension system used for the primary skis (22 and 24) of the present invention is not a limiting factor, and any type of suspension system which provides some type of flex, absorption, and steering for the main (primary) skis is envisioned for the present invention. The shock-absorbing suspension system may include coiled springs, hydraulic pistons and cylinders, leaf springs, or any other type of system which provides flex and/or impact absorption to a ski.

Struts 38 and 40 secure skis 22 and 24 and linkage brackets 28 and 30 to the main chassis of the snowmobile 10. The number of struts, as well as the angle and thickness of the struts is immaterial to the present invention, and a single example is merely shown in the enclosed figures for illustrative purposes only.

Skis 42 and 44 provide the benefits of the present invention described herein. These skis 42 and 44 (also called "auxiliary skis" herein) improve the snowmobile's performance by providing two functions. The first function is to prevent or reduce the amount of snow packing in the wells 18 and 20. As snowmobile 10 travels across deep powder, snow tends to get packed in the suspension wells 18 and 20 of the snowmobile. As the snow fills the wells 18 and 20, and as the snowmobile 10 continues to travel through the powder, the packed wells 18 and 20 provide increased resistance to the movement of the snowmobile 10 through the powder. This increased resistance slows down the snowmobile 10 in the deep powder. Additionally, the responsiveness of the steering of the snowmobile 10 diminishes due to increased drag of the snowmobile 10 through the powder. The increased drag reduces performance and can cause the snowmobile to bog down or become completely stuck.

As can be seen by the location and size of skis 42 and 44, the skis 42 and 44 are positioned to prevent snow from entering the suspension wells 18 and 20 of the snowmobile 10. When the snow hits the front upraised portions 46 of skis 42 and 44, the snow is either deflected, or compressed downward, thus allowing the snowmobile 10 to pass on top of the snow. The end result of this action is that the snow does not pack into the wells 18 and 20 of the snowmobile 10.

The second function is that skis 42 and 44 create additional lift to help the snowmobile stay on top of the deep snow, thus minimizing slow-down of the snowmobile. The auxiliary skis 42 and 44 effectively increase the surface area of the front end of the snowmobile in contact with deep snow, and thus helps better support the front end above the surface of the snow. The surface engaging portions 48 and 50 of the auxiliary skis 42 and 44 are in a plane above the primary skis 22 and 24, and thus do not contact the snow surface except when in deep snow.

Figure 2:
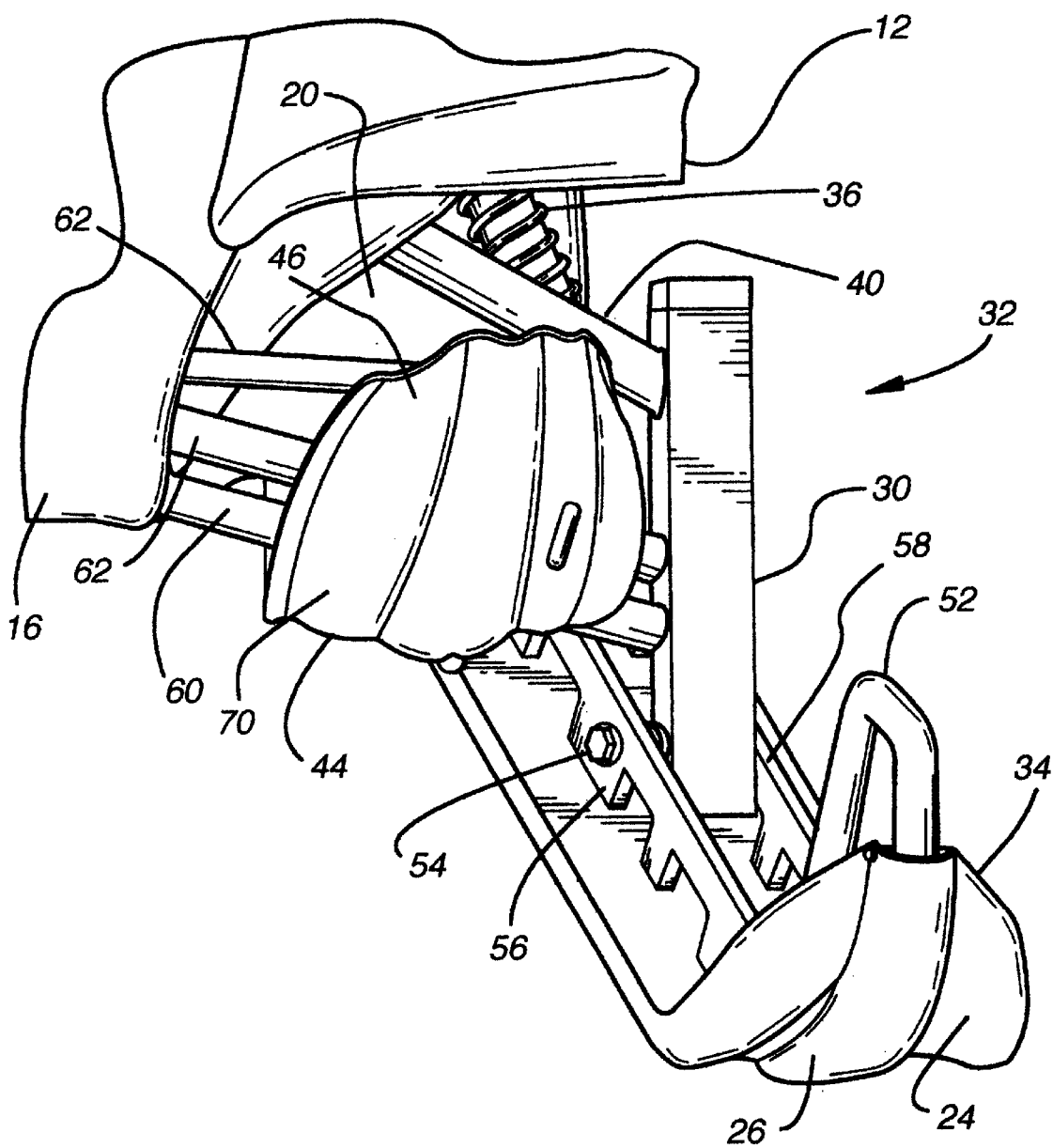
FIG. 2 is a close-up of the left auxiliary ski of the present invention.

FIG. 2 is an isolated view of the front left side of the snowmobile 10 shown in FIG. 1. Ski 24 is shown with a handle projecting as 52. This handle 52 is provided such that the user of the snowmobile 10 may pull or position the front of the snowmobile or maneuver it if the snowmobile is off or idling. Linkage 30 is shown secured to ski 24 by bolt 54. This linkage 30 is secured to the ski 24 through brackets 56 and 58. These brackets are typical brackets found on primary skis of snowmobiles and function as an extension from ski 24 which acts as a retaining bracket such that linkage 30 may be secured to ski 24 using bolt 54. The specifics of how primary ski 24 is secured to snowmobile 10 is not critical to the present invention. The term "primary ski" is meant to denote the skis (22 and 24) mounted on the front of the snowmobile which act to steer and support the snowmobile 10. There can be numerous mechanisms whereby the ski 24 is secured to a snowmobile 10.

Strut 40 is also shown in a preferred position for a strut. However, as discussed above, the strut and suspension system for the skis 22 and 24 disclosed herein are merely one example of virtually hundreds of different types of strut and suspension systems that could be used with the present invention. Additional struts 60 and 62 are part of the suspension system for attaching and supporting the ski 24 on the snowmobile, as well as being part of the steering linkage between the handlebars and the primary ski 24. These struts can be in any of a variety of configurations, and the auxiliary ski 44 of the present invention is mountable on these various configurations.

Figure 3:
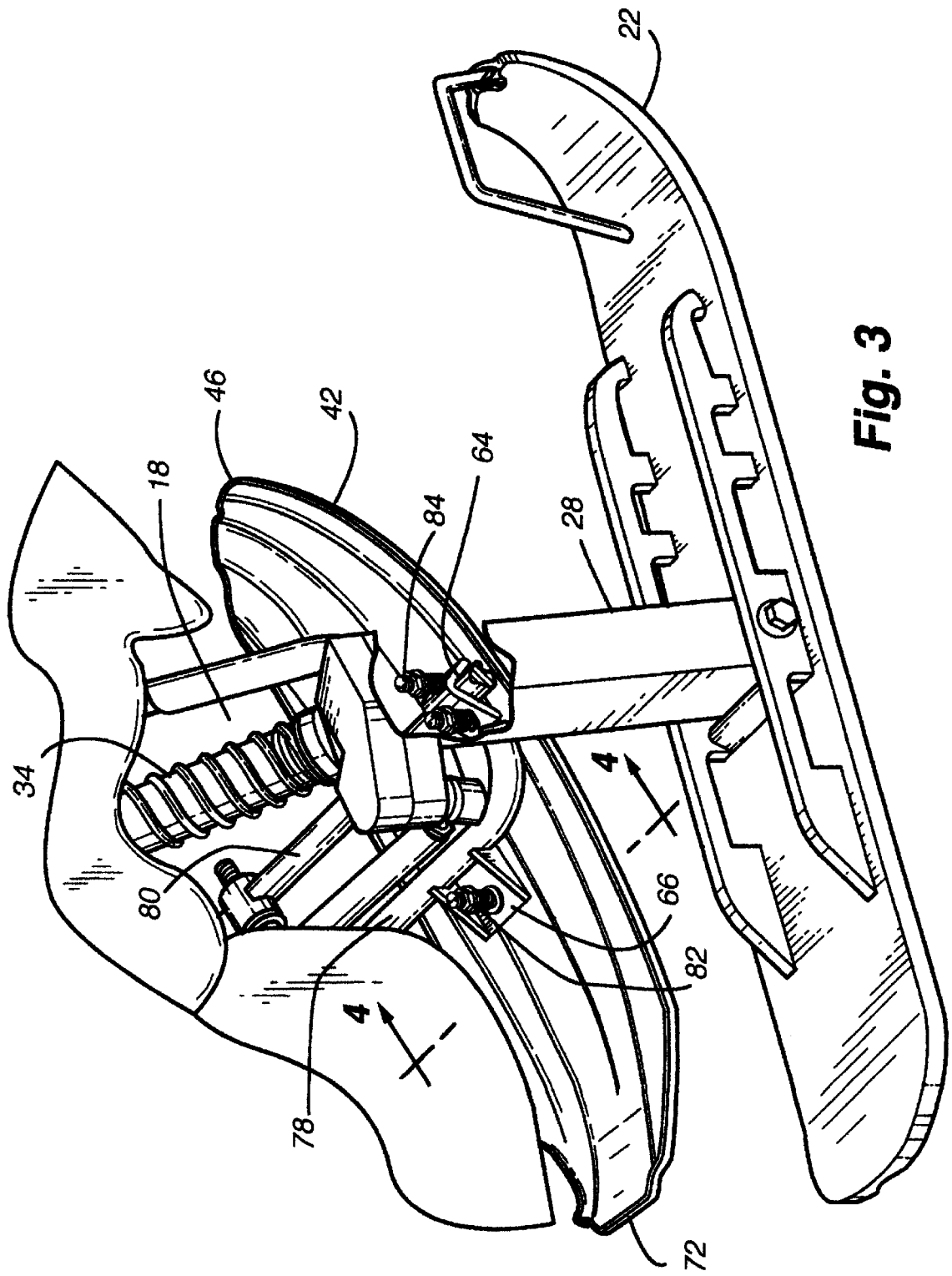
FIG. 3 is a rear side view of the right auxiliary ski of the present invention.
Figure 4:
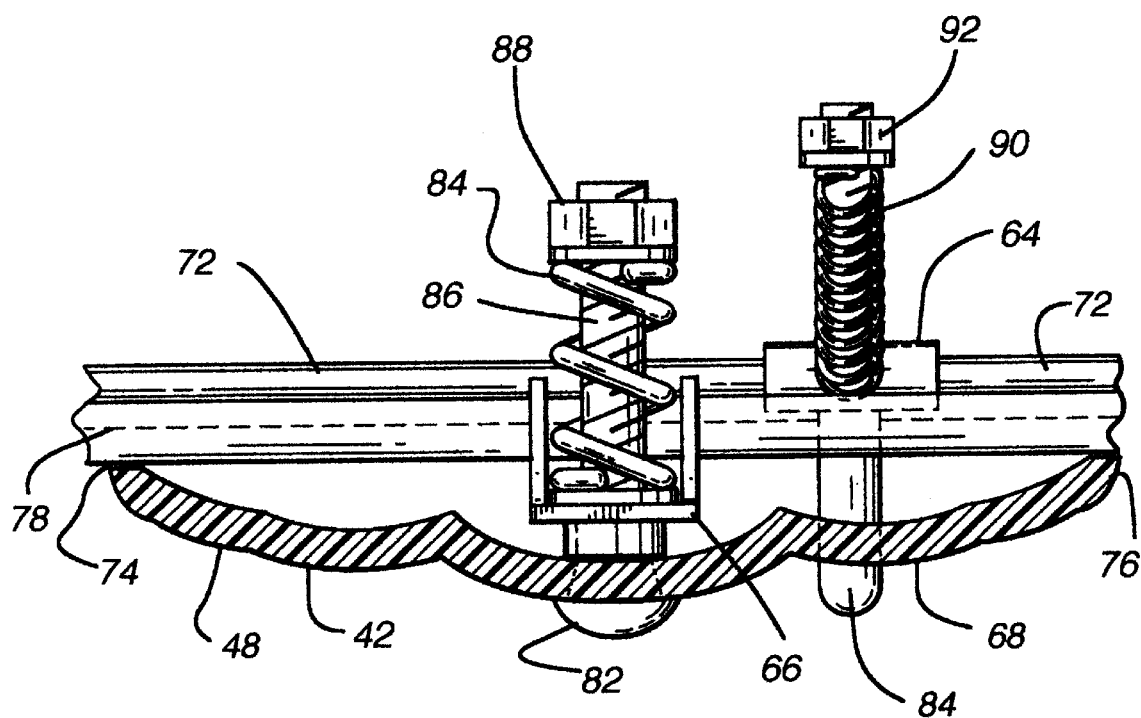
FIG. 4 is a section taken along lines 4 in FIG. 3.

The auxiliary ski 44 of the present invention is shown mounted to the suspension 32 by two mounting brackets 64 and 66. These are more clearly shown in FIGS. 3 and 4. FIGS. 3 and 4 show auxiliary ski 42, which is identical to ski 44, except that it is on the opposite side of the snowmobile. The structure and connections for both skis 42 and 44 are identical or at least closely similar. The position of the skis 42 and 44 are ideally situated such that as the skis 42 and 44 curve upwardly, the width and upward projection covers the majority (more than about 50%) of the area of the entrance of the front suspension well shown generally as 18 (in FIG. 3). Additionally, the plane of the bottom 68 and 70 of the skis 42 and 44, respectively, should be lower than the plane defined by the bottom 16 of cowling 12 of snowmobile 10. The bottom plane of skis 42 and 44 must be higher than the bottom plane of skis 22 and 24. Thus, preferably, the distance between the bottom of the plane of skis 22 and 24 and the bottom of the plane of skis 42 and 44 is approximately five to fifteen centimeters. Additionally, the bottom plane of ski 42 and the bottom plane of ski 44 should be approximately in the horizontal plane to approximately 30° above the horizontal plane. This is measured from the portion of the ski having the flattest longitudinal profile, such as near the tail 72 as opposed to the tip 46 of the auxiliary ski 42. The auxiliary ski 42 has a generally flat longitudinal profile with a curved-up tip 46 and possibly a curved-up tail 72. In width cross-section, as shown in FIG. 4, the ski has a ribbed, curvilinear arcuate shape, sloping upwardly at the longitudinally opposing edges 74 and 76. The other auxiliary ski 44 is similarly formed. Part of either auxiliary ski can be removed or cut out so as to not interfere with the exhaust system of the particular snowmobile.

FIG. 3 discloses a detailed close-up of the invention described herein. Ski 42 is basically secured to struts 78 and 80 by two different securing means. In the preferred embodiment, it is shown that carriage bolt 82 and U-bolt 84 secure ski 42 to the struts 78 and 80 respectively, as is described in more detail below. These struts have dual purpose, in that they support ski 22 as well as ski 42.

An important aspect of the present invention is that the auxiliary ski may be added to a snowmobile in an after market sale in a kit form. This kit form takes the form of a pair of skis, as well as a securing means which secure the skis to existing struts or other components of the snowmobile. Thus, the present invention may be secured to the snowmobile by the original snowmobile manufacturer, or may be added onto existing snowmobiles as an after market item. It is anticipated that different brands of snowmobiles have different strut and suspension systems for the main skis, thus the after market kits may have to be adapted to individual brands and/or models of snowmobiles.

FIG. 3 discloses an embodiment of the present invention wherein carriage bolt 82 is secured to strut 78 through bracket 66. Bracket 66 is a flange which has been welded to strut 78. As an alternative, carriage bolt 82 could extend through an aperture in strut 78, thus not requiring bracket 66. As shown in FIGS. 3 and 4, a spring 84 (FIG. 4) surrounds the shank 86 of the carriage bolt 82, and butts against the bracket 66 and the end fastener 88. The spring biases the carriage bolt in an upwardly direction with respect to the bracket 66 so that the ski 42 is movably held against the member 78 to which it is attached. The spring 84 structure allows the ski to be moved downwardly and away from the member 78 under adequate force (such as by a foot or hand). This allows snow and ice that incidentally forms on the ski 42 to be removed, and also gives the ski 42 some flexibility so as to not break or improperly bend. In normal circumstances, the ski 42 is biased in a position against the member 78.

Other means of securing the carriage bolt 82 or other fastening means to the struts of the snowmobile are envisioned, and the type of securement to the strut or snowmobile is not limiting, however, the spring-loaded mounting is preferred. The carriage bolt 82 is merely shown as one example of a securing or fastening means which secures the ski 42 to a strut or chassis of a snowmobile. Other types of bolts, welds, or linking mechanism may be used. Additionally, the ski does not need to be fastened to a strut but could be fastened to the chassis or the shock absorber or other frame part of the snowmobile. By being fastened to a part of the suspension, however, the auxiliary ski 42 moves up and down with the primary ski. The other ski 44 is held on similarly at its rear end to the snowmobile.

Ski 42 is likewise preferably also secured to a second strut 64 of snowmobile 10 through U-bolt 84. U-bolt 84 extends through the bottom of the ski 42 and is secured around strut 80. As the U-bolt 84 is positioned at the front 46 of the ski 42, the bottom of U-bolt 84 is shown in FIG. 1. The intended purpose of securing ski 42 in two different positions along the ski 42 is to provide adequate support to the ski 42 such that there is minimal movement and minimal flex of the ski 42 during use, other than what is intended by the fastening means. A single connecting point could be used, but preferably two or more locations of the auxiliary ski are secured to a strut or chassis component of the snowmobile 10.

FIG. 4 is a close-up of the preferred securing means shown in FIG. 3 taken along lines 4—4 in FIG. 3. This figure illustrates bolts 82 and 84 secured to a cross-section of ski 42. One-half of U-bolt 84 is shown with spring 90 positioned between the bracket 64 and end fastener 92. The purpose of spring 90 is to allow some movement to ski 42. If ski 42 is pushed in a downward direction for whatever reason, U-bolt 84 will move in a downward direction, thus allowing the ski 42 to move downwardly a short distance. This downward movement may be necessary as ski 42 is propelled through deep powder, applying different forces at the front and back of the ski 42. The spring 90 keeps the ski biased upwardly in a position against or adjacent the member 72. The movement of the ski allowed by this structure is similar to the spring structure on the rear attachment point with bolt 82. Some movement is preferred in that the ski 42 may break or rip off the strut 72 if movement is not allowed. Again, this is preferred such that the ski 42 does not tear away from the strut 72. As discussed above, ski 42 may be secured to a strut or chassis portion of the snowmobile 10 through a single securing means or a plurality of securing means. As shown, the two attachment points for each ski 42 and 44 are spaced laterally and longitudinally apart for added stability of the ski to resist torsional forces. The two attachment points could be in-line both latitudinally and longitudinally and function adequately, but the lateral and longitudinal spacing is preferred. Additionally, the skis 42 and 44 may comprise a plurality of skis, thus there may be two, four or more skis which provide the benefits of the present invention.

The preferred packaging and sale of the invention is in a kit form for after market sale. Thus, a kit with the two or more auxiliary skis would be sold with some type of fastening or securing means. Different kits would be needed for different snowmobiles. Finally, just the skis could be sold in a kit, and the user could install the skis using common hardware components.

Additionally, if the auxiliary skis of the present invention are part of the original equipment on the snowmobile, a separate strut suspension system may be designed for the skis. Again, the type of strut, the type of securing means, or the type of suspension is not limited because of the invention. The present invention is directed to the use of two or more skis which assist the snowmobile in propulsion and floatation through deep powder.

Figure 5:
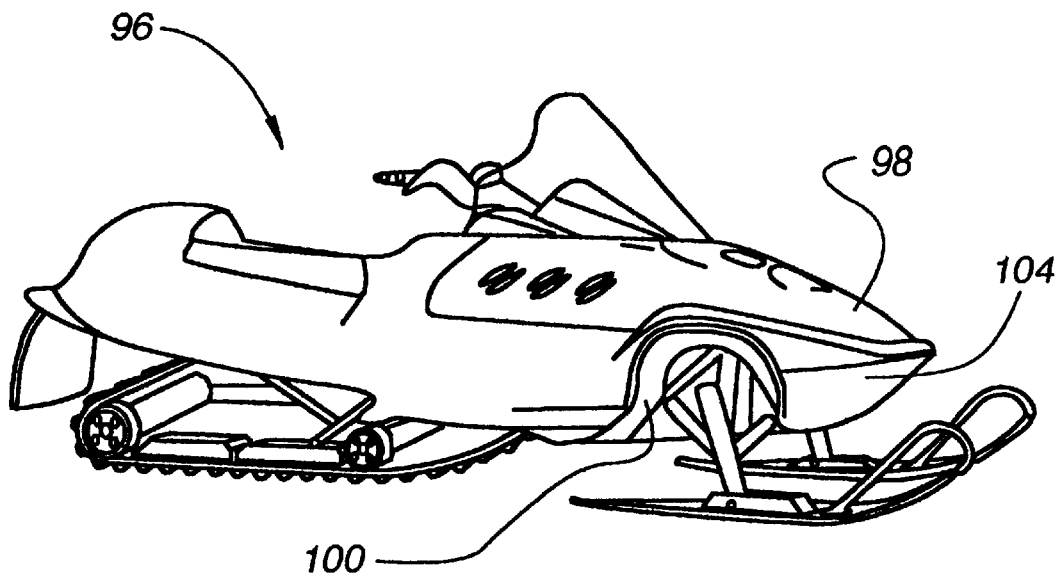
FIG. 5 is a perspective view of a snowmobile.

As noted previously, the size and shape of the snowmobile's cowling 12 is immaterial to the present invention because the utility of the invention is substantially the same regardless of how the cowling is configured. That being said, the shape of the bottom side 16 of the cowling 12, i.e., the belly pan 16, does allow for alternative attachment points for the auxiliary skis 42 and 44 of the present invention. A newer model snowmobile in perspective view is generally shown as 96 in FIG. 5. Snowmobile 96 has a cowling 98 that defines two small U-shaped suspension wells 100 that provide discrete areas through which the machines suspension components pass (compare to FIG. 1). For a snowmobile 96 having this general structure it may be more practical and convenient to attach the auxiliary skis 102 and 103 directly to this different style belly pan 104, as is described in more detail below.

Figure 6:
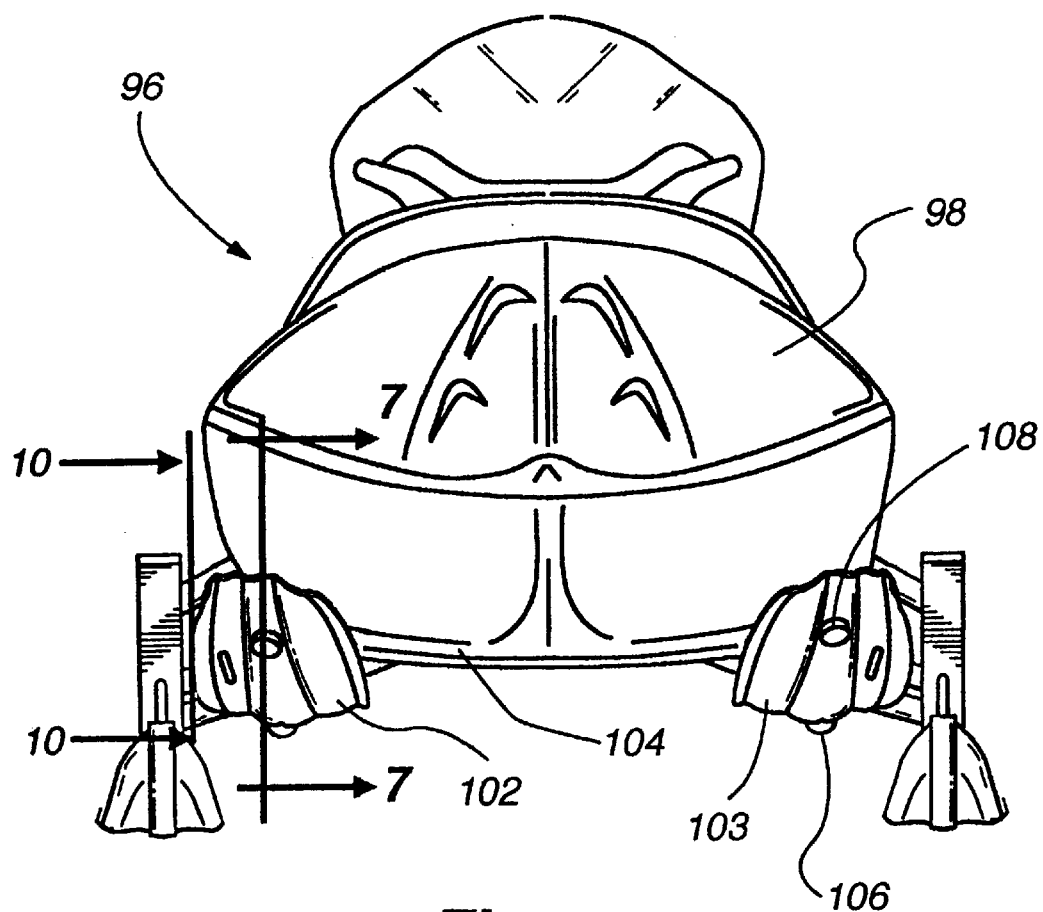
FIG. 6 is a front view of a snowmobile utilizing the floatation ski of the present invention where the ski is attached to the belly pan.

FIG. 6 shows the auxiliary skis 102 and 103 of the present invention attached to a snowmobile's belly pan 104. The skis 102 and 103 are positioned on the belly pan 104 so as to prevent snow form entering the suspension wells 100 of the snowmobile 96. The skis 102 and 103 can be positioned anywhere on the belly pan 104 as long as they function to reduce the amount of snow that enters the suspension wells 100.

Figure 7:
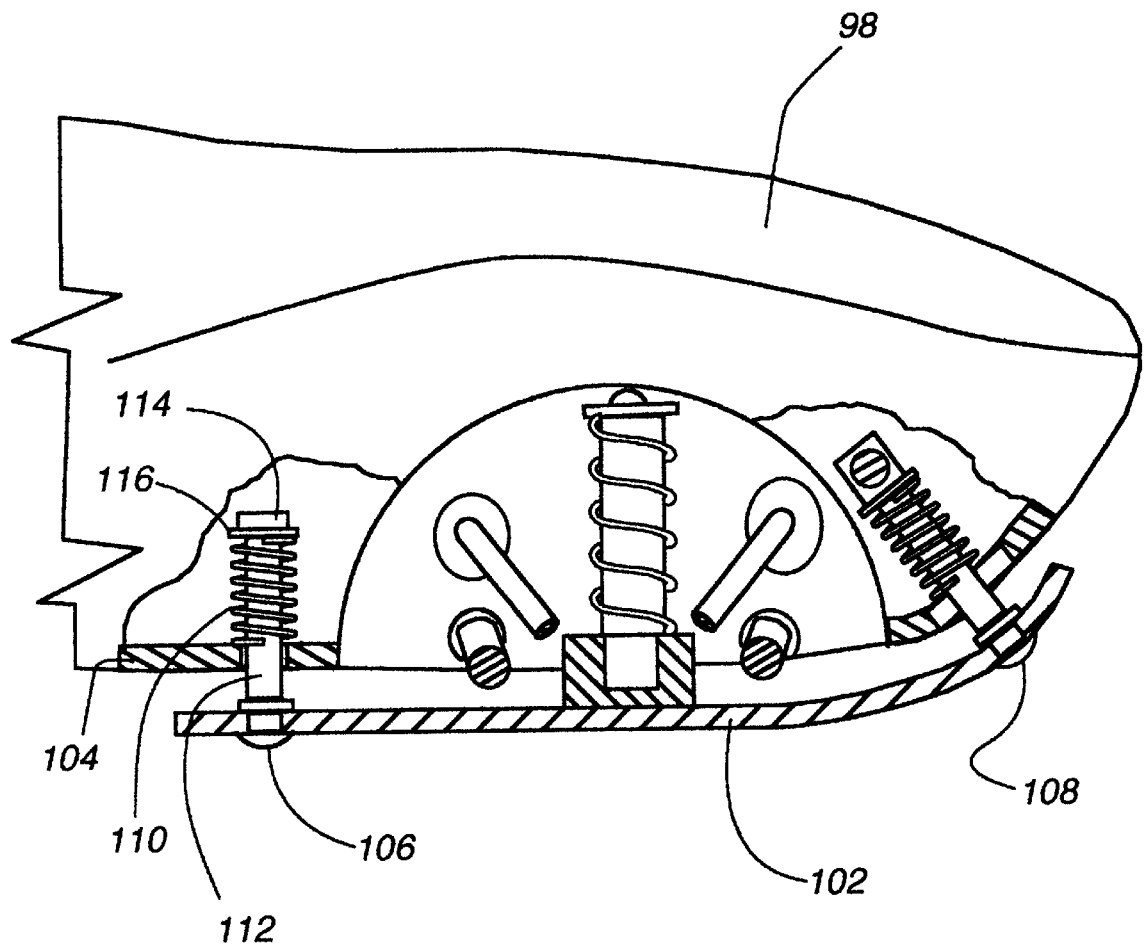
FIG. 7 is a section taken along line 7—7 of FIG. 6.

FIG. 7 is a section view of the preferred securing means of the auxiliary ski 102 to the belly pan 104 taken along lines 7—7 in FIG. 6. This figure illustrates a pair of bolts 106 and 108 secured to the ski 102. In order to facilitate the description of the ski's 102 operative attachment to the belly pan 104 only one bolt assembly will be described. It should be understood that both bolts 106 and 108 have the same parts and functions as is described below.

A carriage bolt 106 is shown with a spring 110 surrounding its shank 112. The spring 110 sits between the belly pan 104 and an end fastener 114. A washer 116 secures the spring 110 in place on the shank 112 of the bolt 106 at the end fastener 114. The spring 110 biases the carriage bolt 106 in an upwardly direction with respect to the belly pan 104 so that the ski 102 is movably held against the belly pan 104 to which it is attached. The spring 110 structure allows the ski 102 to be moved downwardly and away from the belly pan 104 under adequate force (such as by the downward movement of snowmobile's struts), and provides a return force to pull the ski 102 back up to the belly pan 104 when the ski is not under any force. See FIG. 8 The length of the bolt 106 and spring 110 determine the amount of travel that the ski 102 will have when a downward force is applied. Compare FIGS. 8 and 9. The bolt 106 and spring 110 structure are envisioned to have adequate length that allows for full mobility of the snowmobile's suspension system. See FIG. 9.

Other means of securing the auxiliary ski to the belly pan of the snowmobile are envisioned, however, the spring-loaded mounting is preferred. The carriage bolt is merely shown as one example of a securing and fastening means which secures the ski to the belly pan. Other types of bolts, welds, or linking mechanisms may be used. Note that although only one ski is shown in the figures, both skis are secured to the belly pan in a similar fashion.

Figure 8:
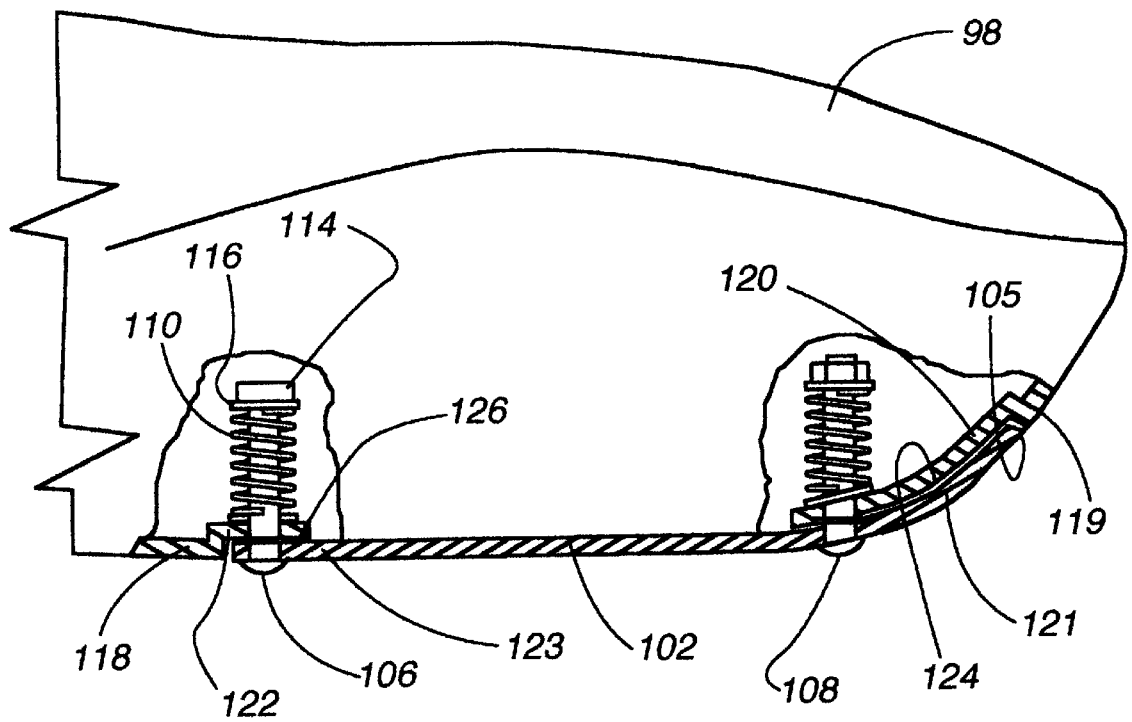
FIG. 8 is a sectional view of a floatation ski of the present invention which is engaged with a belly pan incorporating the indentation of the present invention.
Figure 9:
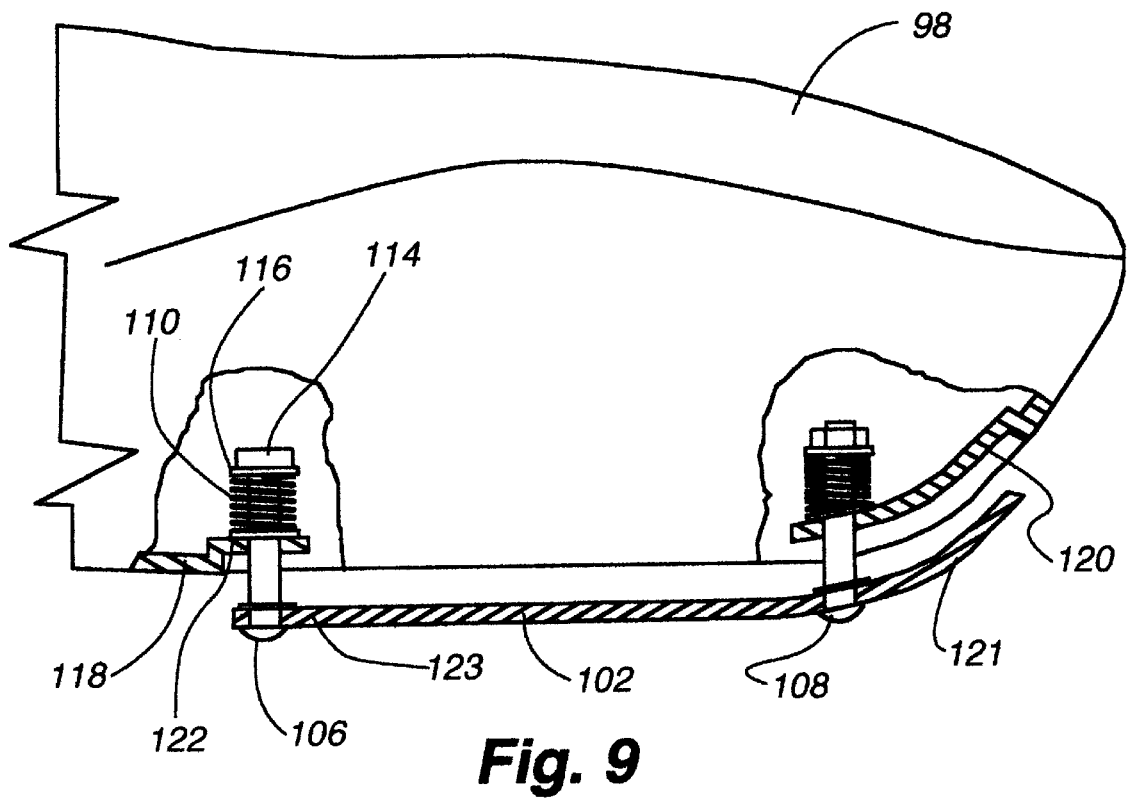
FIG. 9 is similar to FIG. 8, except the floatation ski is extended away from the belly pan.

FIGS. 8 and 9 show an alternative embodiment of the belly pan 118. In order to facilitate the description of the alternative embodiment of the bell pan only one suspension well belly pan embodiment will be described. As before, both suspension well belly pan embodiments have the same structure and functions described below. This embodiment defines two belly pan indentations 120 and 122 per ski 102, whereby each indentation 120 and 122 corresponds to either the front 121 or rear 123 portion of a ski 102. This configuration allows the ski 102 to be held within the confines of the belly pan 118 in the absence of any downward force, so that the bottom surface of the ski 105 is flush with the bottom surface 1 19 of the belly pan 1 18.

The belly pan 118 indentations 120 and 122 are located at the points of contact between the front end 121 of the auxiliary ski and the belly pan indentation 120, and the back end 123 of the auxiliary ski 102 and the belly pan 122. Each indentation 120 and 122 defines an engagement surface 124 and 126 of such length and depth to mirror the size and shape of the secured auxiliary ski 102. When the ski 102 is moveably held in the belly pan indentation 120 and 122, it is in close proximity, and will abut, the engagement surface 124 and 126 of the indentation. See FIG. 8. Ideally, when the ski 102 is held in the indentation 120 and 122, in the absence of any downward force, the ski's bottom plane 105 is flush with the bottom portion 119 of the belly pan 118. The flush configuration of the belly pan/auxiliary ski interaction acts to reduce the amount of snow that can enter the well 100 by way of being forced between the ski's edges and the belly pan. Additionally, the embodiment provides a greater level of aerodynamic efficiency then having the ski attached to the belly pan in the absence of the indentations.

Figure 10:
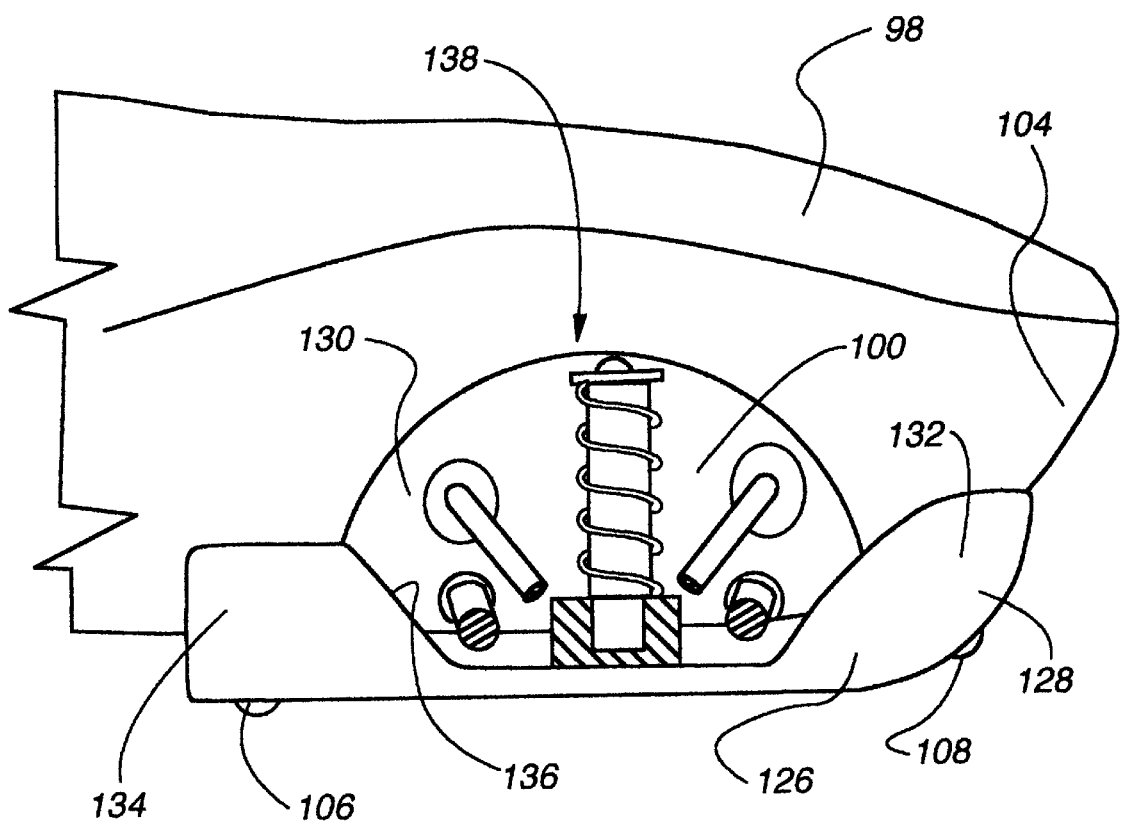
FIG. 10 is a side view of a snowmobile incorporating the second embodiment of the auxiliary ski.

Another alternative embodiment of the auxiliary ski attached to the first embodiment of the belly pan 104 of the present invention is shown in FIG. 10. The ski 126 in this embodiment defines a turned-up or folded-up outside edge 128. The folded-up outside edge 128 is preferably shaped to form a barrier that can reduce the amount of snow that enters through the side opening 130 of the suspension well 100. It is envisioned that the height and shape of the turned-up edge may vary dependent on the size and shape of the suspension, or to the level of protection that the user may wish to obtain with the ski. Ideally, the forward 132 and rear 134 ends of the turned-up edge 128 form a surface that overlaps the side wall of the cowling 98. Additionally, the turned-up side 128 of the ski 126 can be shaped so as to define a retired groove or cut-out 136 in the folded-up outside edge 128 that allows for the free movement of the snowmobile's 96 suspension system 138. It is envisioned that the folded-up ski 126 will be secured to the belly pan 104 as has been previously described above. Additionally, it should be understood that both of the auxiliary skis in this embodiment would have the same shape and function as is described above.

Figure 11:
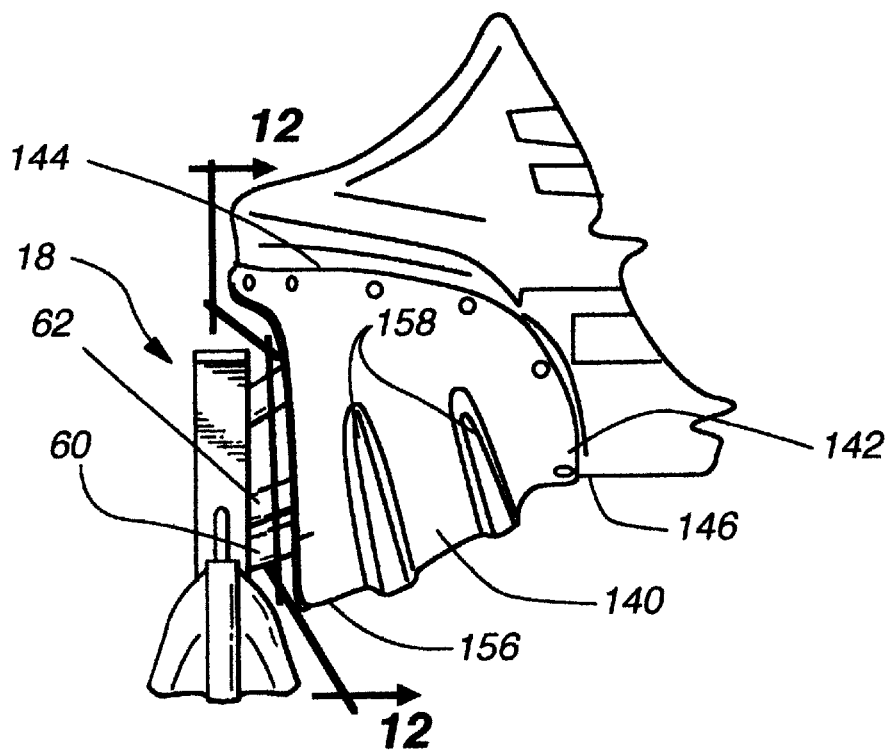
FIG. 11 is a front view of a snowmobile incorporating the third embodiment of the auxiliary ski.

A third embodiment of the auxiliary ski attached to the belly pan is shown in FIGS. 11–14. In FIG. 11, a suspension well 18 of snowmobile 10 is shown in relation to the invention. The auxiliary ski 140 in this embodiment is of such size and shape that it acts as a cover or lid for the opening of the suspension well 18. When the auxiliary ski 140 is positioned in this opening, the perimeter of the ski forms a continuous engagement between inside edge 142 of the ski 140 and the outside rim of the forward 144, inside 146 and rear portions (not shown) of the suspension well. See FIGS. 11 and 12. The ski and the suspension well form a secure seal so as to prevent snow from entering the well from underneath the snowmobile. The ski 140 can be secured to the well rim 144, 146, and 148 using a variety of means, several examples include: welding, riveting, bolting, or other linking mechanisms. Additionally, this interaction can be facilitated by a recess in the well rim that runs the entire length of the well (not shown). The recess would define an engagement slot for the ski to interact with, thus, allowing for the ski 140 and belly pan 104 to have a flush interaction.

Figure 12:
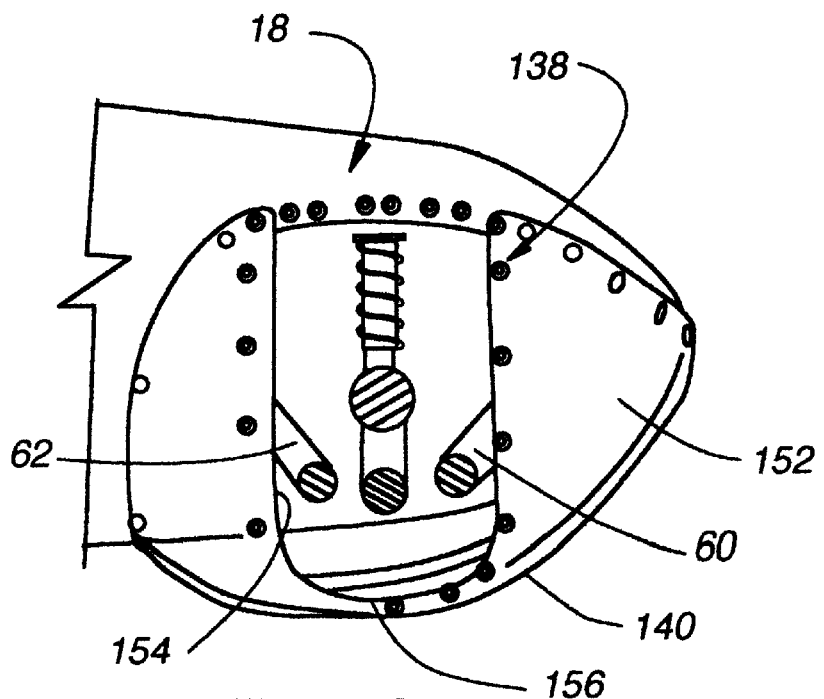
FIG. 12 is a section taken along line 12—12 of FIG. 11.
Figure 19:
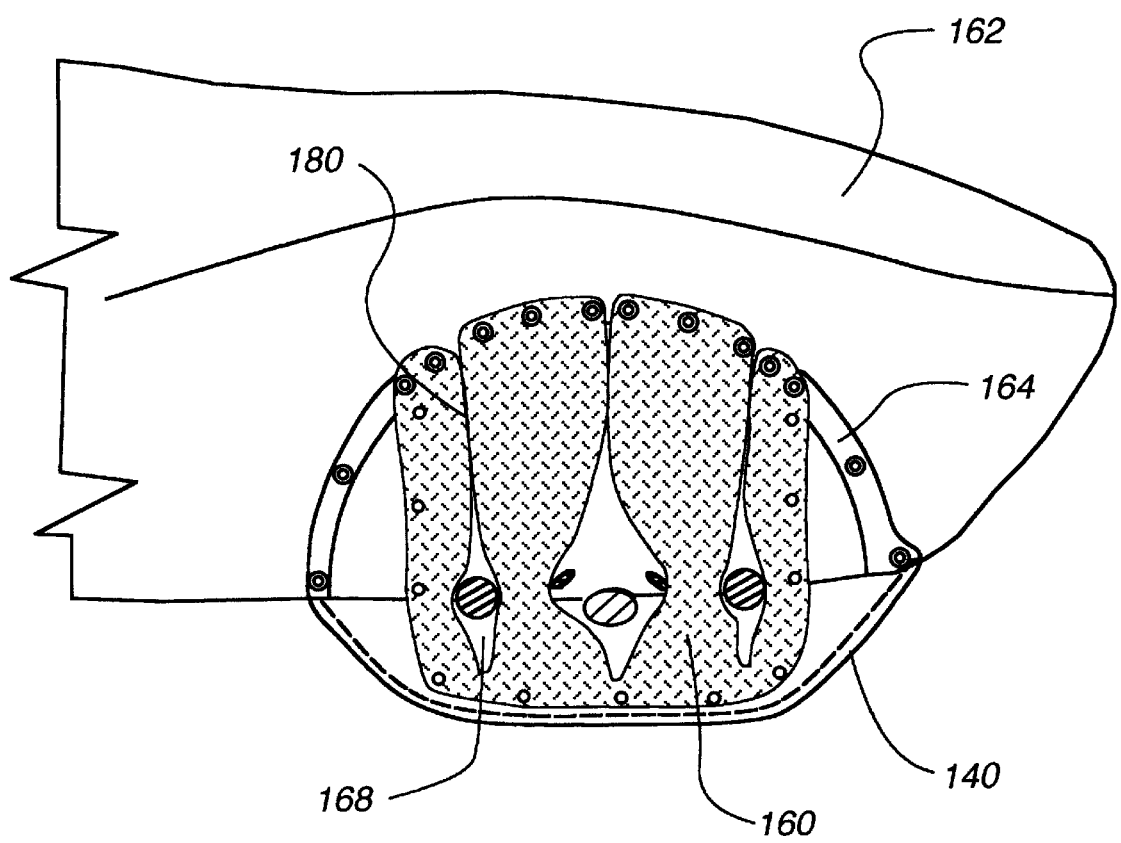
FIG. 19 is a side view of a snowmobile incorporating the skirt of the present invention attached to the third embodiment of the floatation ski.

FIG. 12 is a sectional view of the ski taken along line 12—12 in FIG. 11. The side edge o r wall 152 of this ski 140 folds-up to form a side barrier along the length of the suspension well 18. A retired groove or cut-out 154 is left in the turned-up side wall 152 to ensure that the suspension apparatus 138 is able to have full mobility without contacting the ski 140. The size and shape of the side wall 152 of this ski 140 will depend on the shape of the snowmobile 10 and 96 cowling 12 and 98 and the user's desires to keep s now out of the well. See FIGS. 12 and 13. It is also envisioned that some users may wish to have no side wall on the ski 140. Compare FIGS. 12 and 13 with 19, where FIG. 19 shows the present auxiliary ski embodiment with no side wall but with a n alternative structure for preventing snow and ice from entering the suspension well, as will be discussed more fully below.

Figure 14:
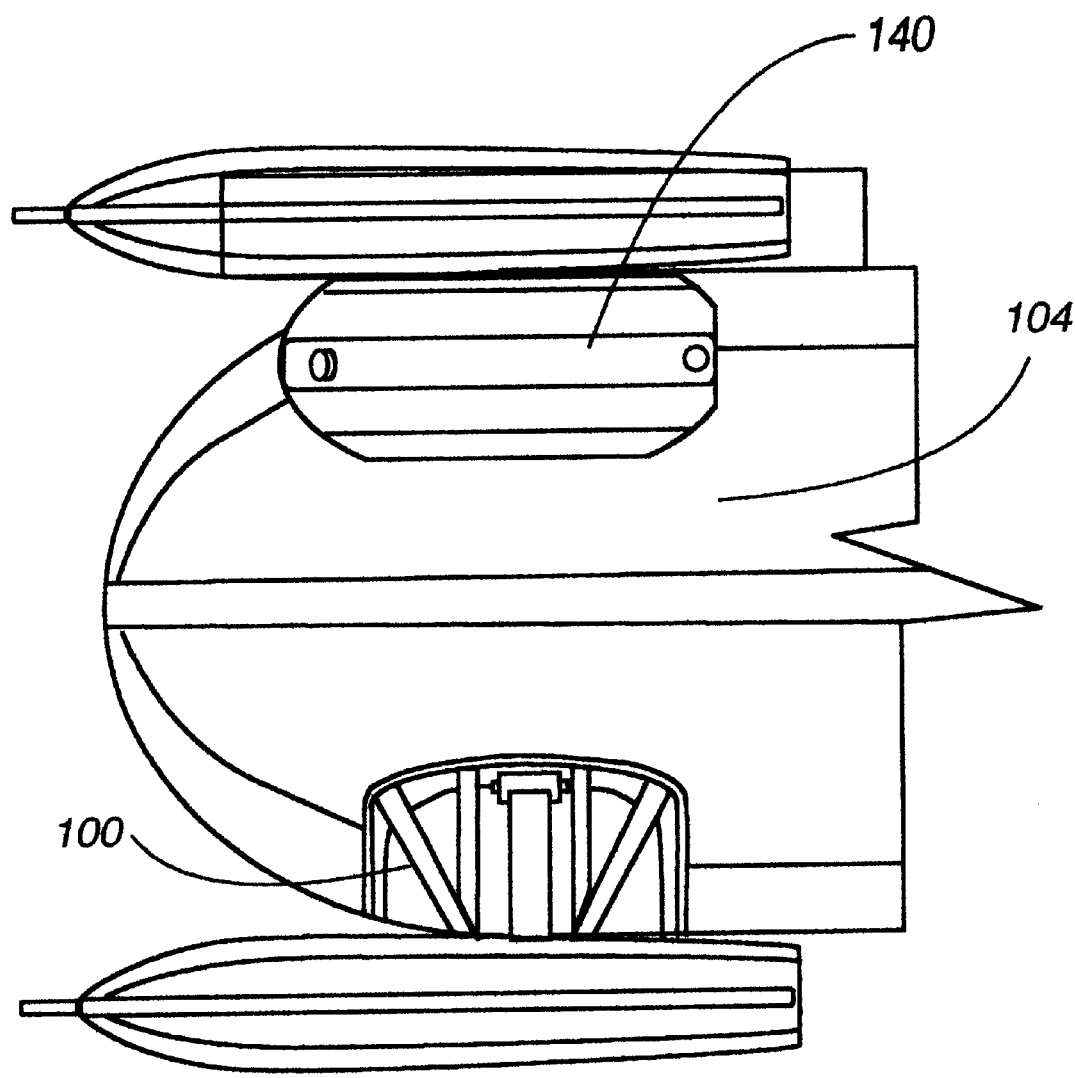
FIG. 14 is a bottom view of a snowmobile incorporating the third embodiment of the auxiliary ski.

FIG. 14 shows a view of the bottom side of a snowmobile utilizing the present embodiment of the auxiliary ski 140. As is shown, the suspension well is effectively covered by the ski 140 to create a seal on the bottom side of the suspension well opening.

Figure 13:
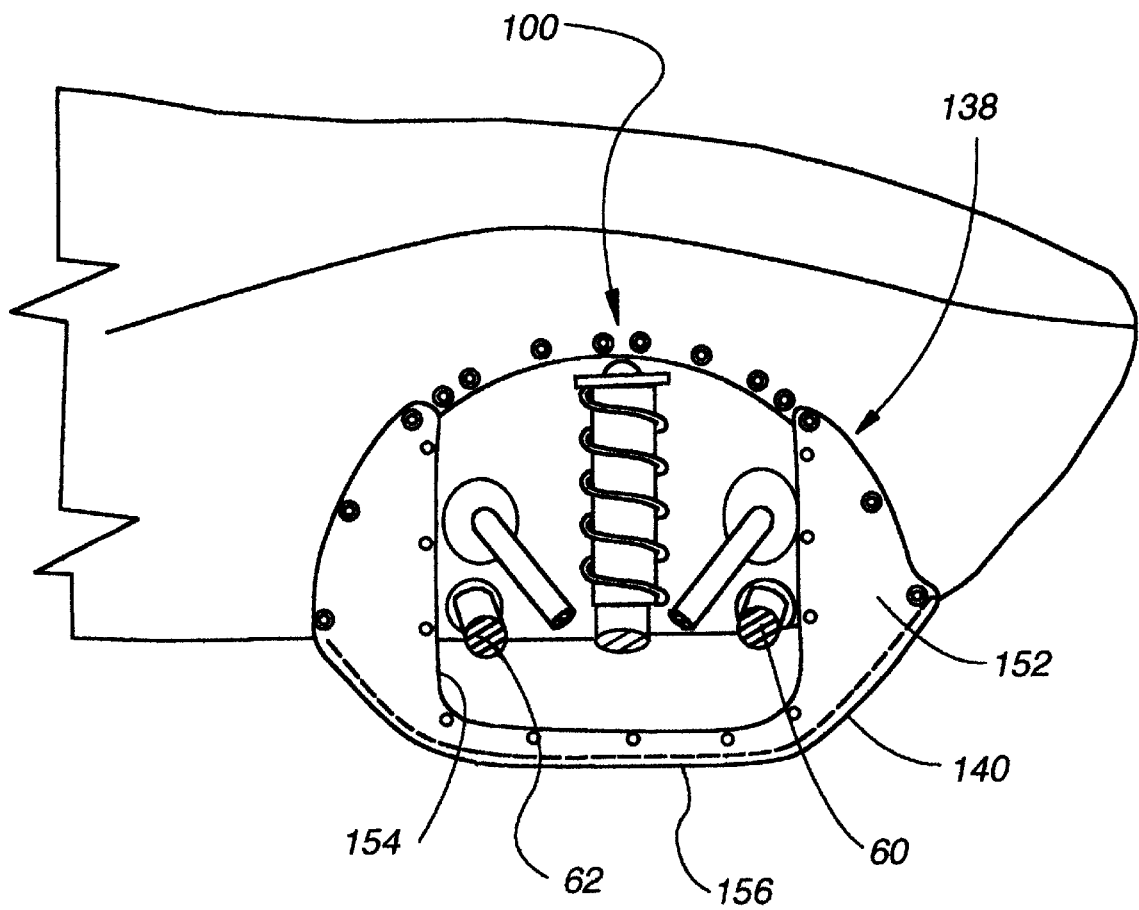
FIG. 13 is side view of a snowmobile incorporating the third embodiment of the auxiliary ski.

The ski 140 of this embodiment has a generally bowed shape to allow full movement of the snowmobile's suspension system 138. As shown in FIGS. 11, 12 and 13, the middle section 156 of the ski 140 drops below the point of maximum movement for the snowmobile's struts 60 and 62, thus, eliminating any potential interference between the struts 60 and 62 and the ski 140. Additionally, the ski can define a series of longitudinal contours 158 on the bottom side of the ski to increase the snowmobile's lateral stability in deep snow. See FIG. 11. This embodiment of the ski 140 can also be attached to the belly pan 16 or 104 utilizing the spring-loaded mounting system describe above (not shown). Under such circumstance it would not be necessary for the ski to have a bowed shape because the ski 140 can move in a downward direction when the struts 60 and 62 move in a downward direction.

In addition to the auxiliary ski of the present invention, a "suspension well skirt" of the present invention is shown in FIGS. 15–19. Like the floatation ski, the suspension well skirt 160 works to reduce or eliminate snow from entering the suspension well. The skirt 160 can act alone or in conjunction with the auxiliary ski.

In general, the skirt 160 attaches to the cowling 162 along the perimeter 164 of the suspension well 172 and extends over the well opening 166 in the cowling 162. The skirt 160 includes an aperture 168 to allow the suspension components 138 to extend therethrough, which allows the suspension to move up and down without interference from the skirt 160. The bottom edge 170 of the skirt 160 can be attached to the outer edge of any of the before discussed embodiments of the floatation ski 42, 126 , and 140 regardless of the ski's attachment location to the snowmobile, i.e., ski attached to the suspension system components or to the belly pan. The skirt is also useful in the absence of a floatation ski, where the bottom edge 170 of the skirt 160 would simply hang freely. See FIG. 16. When the skirt 160 hangs freely, it is preferable for the skirt 160 to define slots 171 at its bottom edge 170, thereby allowing for the free movement of the snowmobile's suspension system 138 without interference from the skirt 160.

The skirt is preferably made of any material that remains flexible at relatively low temperatures, such as certain vinyls, plastics, leather, cloth, canvas or other suitable material. The skirt 160 is attached along the perimeter 164 of the suspension well 172 either permanently, such as by rivets, or releasably, such as by snaps or by a hook-and-loop type fastener, such as Velcro®. The attachment of the skirt 160 to the perimeter 164 of the well 172 should be relatively strong, even when a releasable attachment is contemplated, to withstand the force of impact with the snow and other objects. The skirt 160 is positioned so as to cover the suspension well 172, to allow the suspension 138 to extend therethrough, and to keep snow from entering the suspension well 172.

Figure 15:
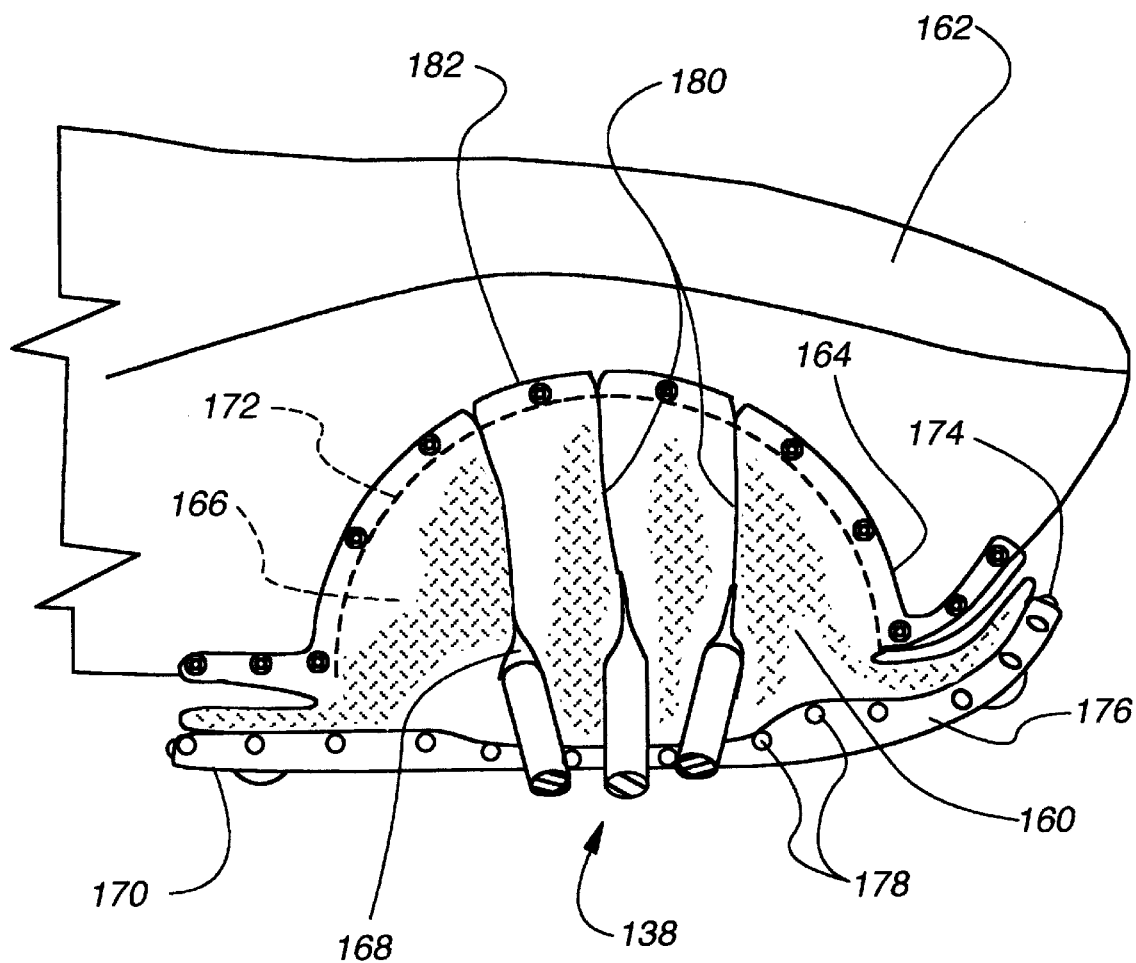
FIG. 15 is a side view of a snowmobile incorporating the skirt of the present invention attached to a floatation ski.
Figure 16:
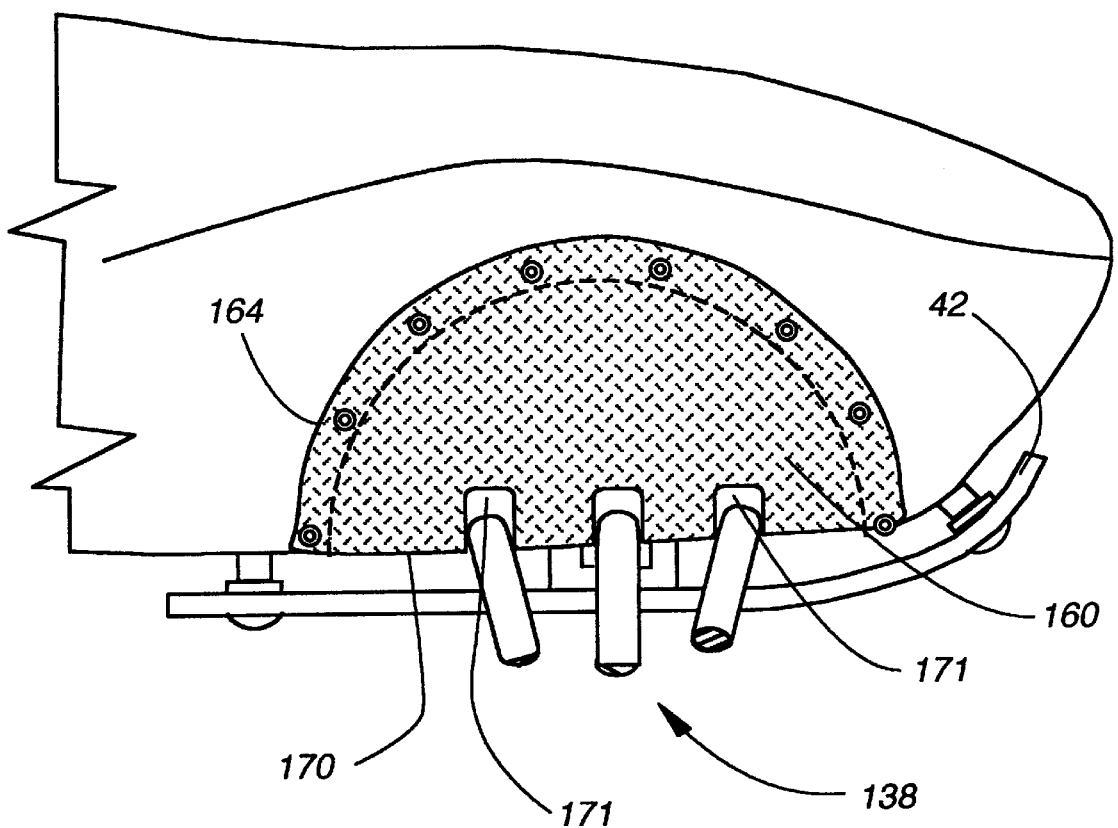
FIG. 16 is a side view of a snowmobile incorporating the skirt of the present invention where the skirt hangs freely.
Figure 17:
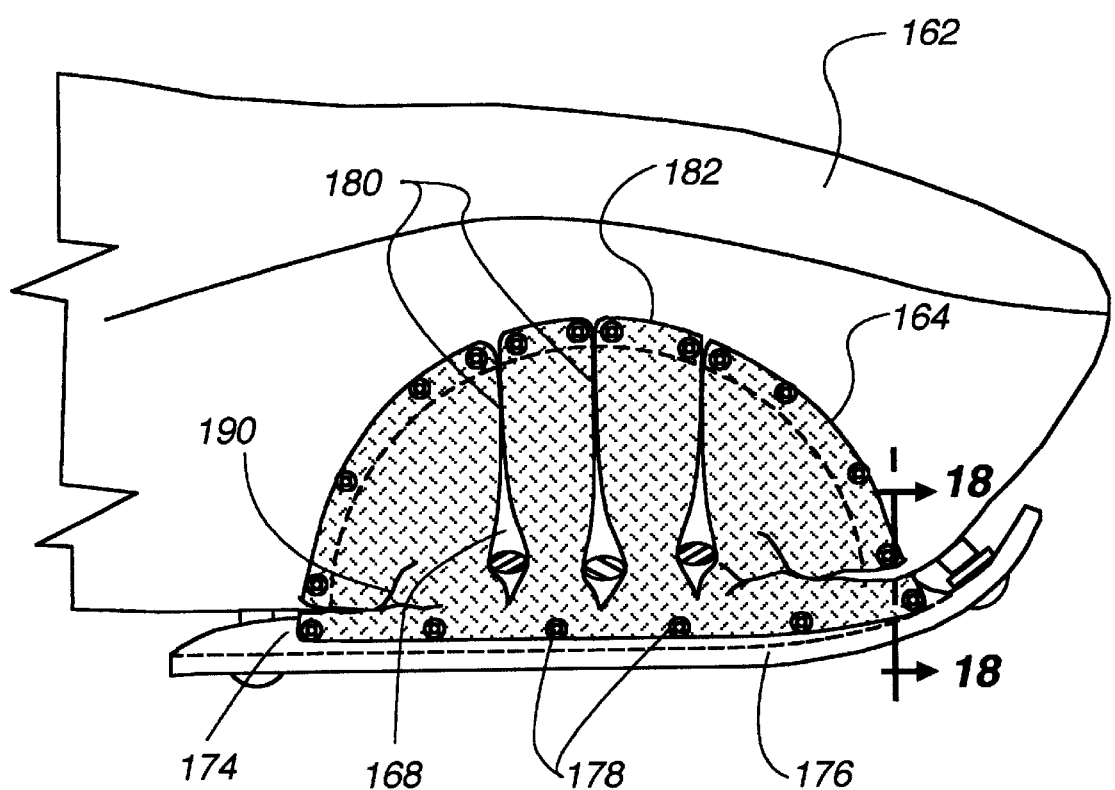
FIG. 17 is a side view of a snowmobile incorporating the skirt of the present invention attached to a floatation ski.

As shown in FIGS. 15 and 17, one example of the skirt is attached along part of the top outer perimeter 164 of the suspension well 172 and extending downwardly to the outer edge 174 of the floatation ski 176. In this example the skirt 160 attaches to the outer edge 174 of the floatation ski 176 by snaps 178. As discussed previously, the floatation ski can move freely with the suspension system 138, thus, the skirt 160 must be sized to allow the ski 176 to move up and down without causing the release of the snaps either on the cowling or the ski due to such movement.

As shown in FIGS. 15 and 17, the aperture 168 formed in the skirt 160 allows the suspension system 138 (rods) to extend through the skirt 160, and is sized to allow the suspension 138 to move and up and down without interference by the skirt 160. It is envisioned that there can be a single aperture (not shown) to facilitate the rods extending through the skirt or there can be several apertures to accomplish this task. See FIGS. 15 and 17. One elongated aperture would allow more free movement of the suspension rods, and several apertures (e.g., one for each rod) would allow more protection against the snow entering the suspension well.

To allow the skirt 160 to be attached and removed from its location on the snowmobile 10 and 96, a slit 180 is formed in the skirt, such as from the aperture 168 to the top 182 or bottom 170 edge of the skirt 160. (See FIG. 17). The slit 180 can be opened to allow the suspension rods 138 to be placed through the aperture 168. The slit 180 can be closed (by snaps or Velcro®, etc.) to provide the desired coverage of the suspension well 172, and to allow the skirt 160 to be removed. Each aperture 168 will require a slit 180 for proper placement of the skirt onto the well.

Figure 18:
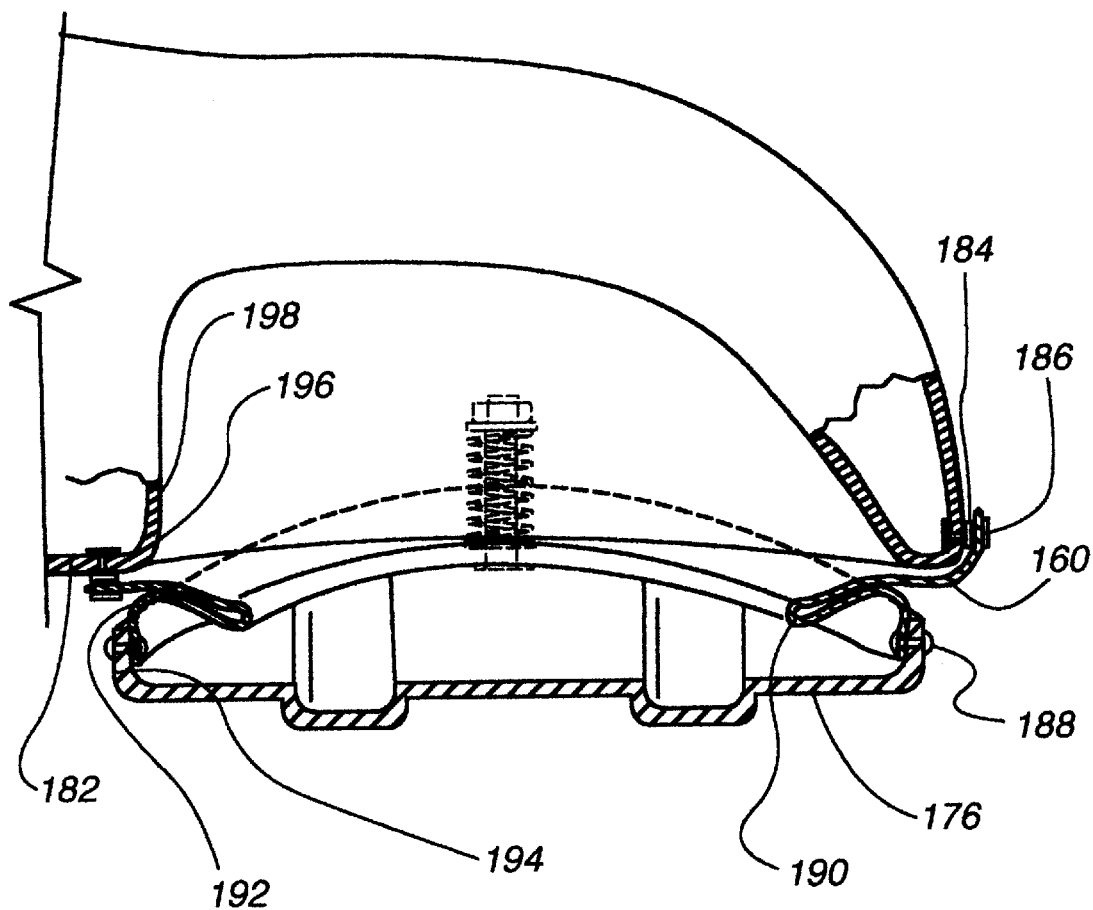
FIG. 18 is a section taken along line 18—18 of FIG. 17.

FIG. 18 is a sectional view of the suspension well skirt taken along lines 18—18 of FIG. 17. FIG. 18 illustrates several possible means of securing the skirt 160 to the belly pan 182 and to the ski 176. Specifically, the side wall of the belly pan has a snap receiving portion 184 embedded in the belly pan 182. A corresponding snap portion 186 in the skirt material allows the skirt 160 to be snapped to the belly pan 182. Additionally, the skirt 160 can also be riveted 188 to the ski 176, as is shown in FIG. 18. Note that the skirt 160 has extra folded material 190 to facilitate the movement of the suspension system 138.

Under certain circumstances, it will also be useful to have a suspension well skirt 192 extending between the interior edge 194 of the floatation ski 176 and the exterior edge 196 of the belly pan 182 in the suspension well 172. See FIG. 18. The inside skirt 192 keeps snow and other articles from entering the suspension well 172 through the gap between the ski 176 and the inside perimeter 198 of the suspension well 172.

Thus, skirts 160 and 192 may be attached to both edges 164 and 198 as described above, whereby each skirt 160 and 192 is made of the same similar flexible material. The inside skirt 192, like the corresponding outside skirt 160, is long enough to allow the floatation ski 176 to move up and down as needed without hindrance. The attachment of the skirt 160 and 192 between the floatation ski 176 and the belly pan 182 can be continuous along the length of the ski 176, or can be along any part of the length of the ski 176, as is desired. As is shown in FIG. 18, the inside skirt 192 can be secured to the belly pan 182 and the ski 176 in a similar manner as was described for the outside skirt 160.

As shown in FIG. 19, the outside skirt 160 is also envisioned to attach between the perimeter of the well 164 opening in the cowling 162 and the third embodiment of the auxiliary ski 140. In this case the skirt 160 could replace the need of having a folded-up side wall 152 on the ski 140 or, alternatively, could be used to simply cover the groove 154 left in the turned-up ski side wall 152.

Figure 20:
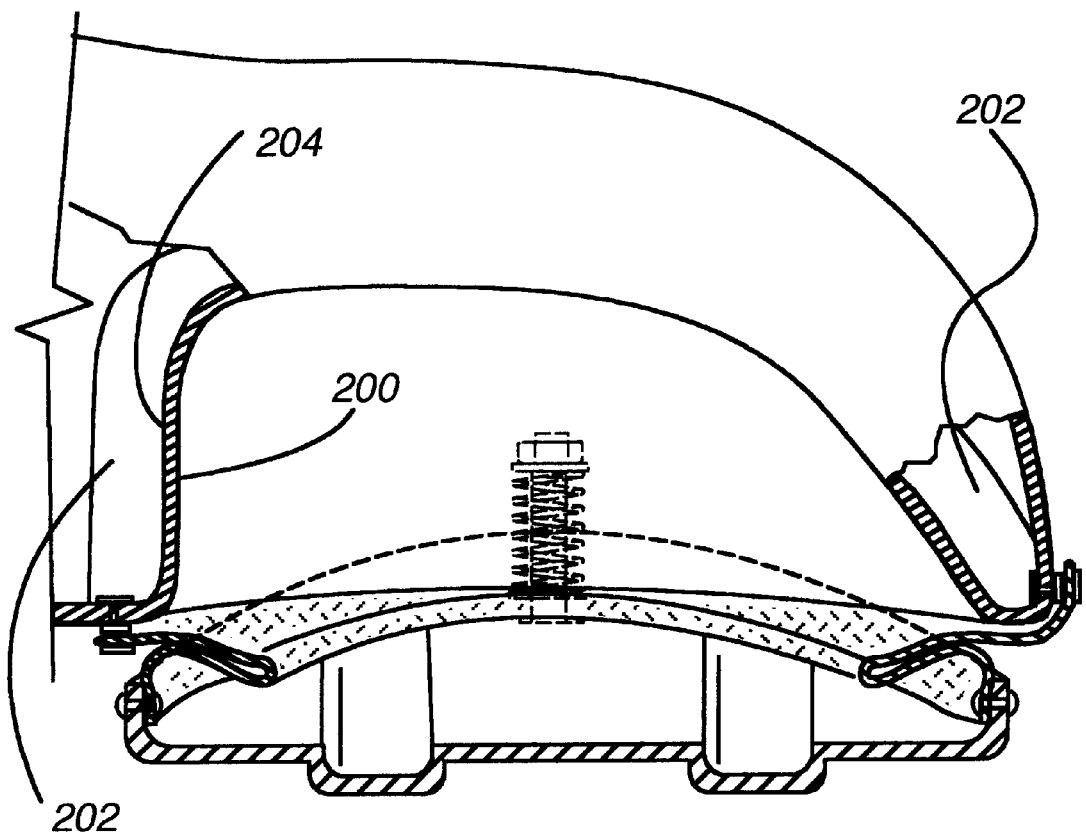
FIG. 20 is a section taken along line 18—18 of FIG. 17 showing the engine wall insulation.

In addition to the auxiliary ski 42, 126, 140 and 176 and suspension well skirt 160 and 192 of the present invention, the suspension well insulation of the present invention is shown in FIG. 20. Typically, the inside of the suspension well 200 also functions as the outer wall of the snowmobile's engine housing (not shown). As such, as the snowmobile 10 and 96 is in use the inside suspension well wall 200 tends to heat-up, causing the packed snow in the well to melt. The melted snow eventually turns to ice as more snow enters the suspension well 172 and the temperature inside the well drops. This process of ice formation is significant because it can exacerbate the problem of the snow pack interfering with the movement of the suspension system 138.

A possible way of avoiding snow melt and the subsequent formation of ice within the wells is shown in FIG. 20. A layer of insulation 202 is shown attached to the engine compartment side 204 of the inside well wall 200. The insulation 202 is preferably of a foam consistency and can have an adhesive on it with aluminum foil on the side facing the engine. However, it is envisioned that any type of insulation of the well would suffice, as long as it did not interfere with the suspension system and functioned to insulate the well from the engine heat.

While the invention has been particularly shown and described with reference to a preferred embodiment thereof, it will be understood by those skilled in the art that various other changes in the form and details may be made without departing from the spirit and scope of the invention. A presently preferred embodiment of the snowmobile suspension invention and many of its improvements have been described with a degree of particularity. It should be understood that this description has been made by way of example, and that the suspension invention is defined by the scope of the following claims.

I claim:

1. A suspension for a snowmobile, said suspension comprising:

a first and second primary ski, said first and second primary ski supporting a front end of said snowmobile, said first and second primary ski being steerably connected to means for steering said snowmobile, and first and second skis having a first bottom horizontal plane which contacts the ground when said snowmobile is at rest;

a first strut linkage assembly comprising one or more parts which is linkably connected between a first chassis point of said snowmobile and said first primary ski;

a second strut linkage assembly comprising one or more parts which is linkably connected between a second chassis point of said snowmobile and said second primary ski;

a cowling defining a belly pan, said belly pan having a bottom side; and an auxiliary ski secured to said bottom side of said belly pan, said auxiliary ski having a second bottom horizontal plane which is higher than said first horizontal plane such that said auxiliary ski does not contact the ground when said snowmobile is at rest on a flat surface.

2. The suspension of claim 1 wherein a first and second auxiliary ski are secured to said bottom side of said belly pan.

3. The suspension of claim 1 wherein said auxiliary ski is wider than said primary skis.

4. The suspension of claim 1 wherein the first horizontal plane is about 5–15 centimeters lower than said second horizontal plane.

5. The suspension of claim 1 wherein said securement of said auxiliary ski to said belly pan has a means for movement such that said auxiliary ski may move downward when said auxiliary ski is forced down.

6. The suspension of claim 1 wherein said belly pan defines an indentation and said auxiliary ski is positioned in said indentation.

7. The suspension of claim 6 wherein said auxiliary ski, positioned in said indentation, is flush with said belly pan.

8. The suspension of claim 6 wherein said auxiliary ski is positioned only partially in said indentation.

9. The suspension of claim 5 wherein said auxiliary ski is secured to said belly pan utilizing one bolt positioned with a spring.

10. The suspension of claim 5 wherein said auxiliary ski is secured to said belly pan utilizing a plurality of bolts, each said bolt positioned with a spring.

11. The suspension of claim 2 wherein said first and second auxiliary skis have a first and second edge, said first and second edges being folded-upward.

12. The suspension of claim 2 wherein said belly pan defines a first and second suspension well, each said suspension well having a first and second end.

13. The suspension of claim 12 wherein said first auxiliary ski has a first and second end, said first end being attached to said first end of said first suspension well and said second end being attached to said second end of said first suspension well, and wherein said second auxiliary ski has a first and second end, said first end being attached to said first end of said second suspension well and said second end being attached to said second end of said second suspension well.

14. The suspension of claim 13 wherein said first auxiliary ski has a first bottom side and said second auxiliary ski has a second bottom side, each said first and second bottom sides defining a contour.

15. A suspension for a snowmobile, said suspension comprising:
 a first and second primary ski, said first and second primary ski supporting a front end of said snowmobile, said first and second primary ski being steerably connected to means for steering said snowmobile, said first and second skis having a first bottom horizontal plane which contacts the ground when said snowmobile is at rest;
 a first strut linkage assembly comprising one or more parts which is linkably connected between a first chassis point of said snowmobile and said first primary ski;
 a second strut linkage assembly comprising one or more parts which is linkably connected between a second chassis point of said snowmobile and said second primary ski;
 a first and second auxiliary ski, said first auxiliary ski secured to said first strut of said first primary ski and said second auxiliary ski secured to said second strut of said second primary ski, said first and second auxiliary skis having a second bottom horizontal plane which is higher than said first horizontal plane such that said auxiliary skis do not contact the ground when said snowmobile is at rest on a flat surface, and said first auxiliary ski has a first top side and first outside horizontal edge and said second auxiliary ski has a second top side and a second outside horizontal edge;
 a cowling defining a belly pan, said belly pan defining a first and second suspension well whereby the first suspension well defines a first rim and the second suspension well defines a second rim;
 a first skirt secured between said first rim and said first auxiliary ski; and
 a second skirt secured between said second rim and said second auxiliary ski.

16. The suspension of claim 15 wherein said first auxiliary ski has a first and second side and said first and second sides are folded upward, and said second auxiliary ski has a first and second side and said first and second sides are folded upward.

17. The suspension of claim 15 wherein said first skirt defines an aperture to allow said first strut linkage assembly to pass through said first skirt and said second skirt defines an aperture to allow said second strut linkage assembly to pass through said second skirt.

18. The suspension of claim 17 wherein said first and second skirts each define a plurality of apertures.

19. The suspension of claim 15 wherein said securement of said first skirt between said first rim and said first auxiliary ski is accomplished using snaps and wherein said securement of said second skirt between said second rim and said second auxiliary ski is accomplished using snaps.

20. The suspension of claim 15 wherein said securement of said first skirt between said first rim and said first auxiliary ski is accomplished using Velcro® and wherein said securement of said second skirt between said second rim and said second auxiliary ski is accomplished using Velcro®.

21. The suspension of claim 15 wherein said first skirt is secured between said first rim and said first outside horizontal edge of said first auxiliary ski, and said second skirt is secured between said second rim and said second outside horizontal edge of said second auxiliary ski.

22. The suspension of claim 15 wherein said first skirt is secured between said first rim and said first top side of said first auxiliary ski, and said second skirt is secured between said second rim and said second top side of said second auxiliary ski.

23. The suspension of claim 15 wherein said first skirt is secured between said belly pan and said first outside horizontal edge of said first auxiliary ski, and said second skirt is secured between said belly pan and said second outside horizontal edge of said second auxiliary ski.

24. The suspension of claim 15 wherein said first skirt is secured between said belly pan and said first top side of said first auxiliary ski, and said second skirt is secured between said belly pan and said second top side of said second auxiliary ski.

25. The suspension of claim 15 wherein said first auxiliary ski has a first and second end, said first end being attached to said first end of said first suspension well and said second end being attached to said second end of said first suspension well, and wherein said second auxiliary ski has a first and second end, said first end being attached to said first end of said second suspension well and said second end being attached to said second end of said second suspension well.

26. The suspension of claim 25 wherein said first auxiliary ski has a first bottom side and said second auxiliary ski has a second bottom side, each said first and second bottom sides defining a contour.

27. A suspension for a snowmobile, said suspension comprising:
 a first and second primary ski, said first and second primary ski supporting a front end of said snowmobile, said first and second primary ski being steerably connected to means for steering said snowmobile, said first and second skis having a first bottom horizontal plane which contacts the ground when said snowmobile is at rest;
 a first strut linkage assembly comprising one or more parts which is linkably connected between a first chassis point of said snowmobile and said first primary ski;
 a second strut linkage assembly comprising one or more parts which is linkably connected between a second chassis point of said snowmobile and said second primary ski;
 first and second auxiliary ski, said first auxiliary ski secured to said first strut of said first primary ski and said second auxiliary ski secured to said second strut of said second primary ski, said first and second auxiliary skis having a second bottom horizontal plane which is higher than said first horizontal plane such that said auxiliary skis do not contact the ground when said snowmobile is at rest on a flat surface, and said first auxiliary ski having a first top side and a first inside horizontal edge and said second auxiliary ski having a second top side and a second inside horizontal edge;

a cowling defining a belly pan, said belly pan defining a first and second suspension well whereby the first suspension well defines a first inside rim and the second suspension well defines a second inside rim;

a first skirt, said first skirt secured between said first inside rim and said first auxiliary ski; and a second skirt, said second skirt secured between said second inside rim and said second auxiliary ski.

28. The suspension of claim 27 wherein said securement of said first skirt between said first inside rim and said first auxiliary ski is accomplished using snaps and wherein said securement of said second skirt between said second inside rim and said second auxiliary ski is accomplished using snaps.

29. The suspension of claim 27 wherein said securement of said first skirt between said first rim and said first auxiliary ski is accomplished using Velcro® and wherein said securement of said second skirt between said second rim and said second auxiliary ski is accomplished using Velcro®.

30. The suspension of claim 27 wherein said first skirt is secured between said first inside rim and said first inside horizontal edge of said first auxiliary ski, and said second skirt is secured between said second inside rim and said second inside horizontal edge of said second auxiliary ski.

31. The suspension of claim 27 wherein said first skirt is secured between said first inside rim and said first top side of said first auxiliary ski, and said second skirt is secured between said second inside rim and said second top side of said second auxiliary ski.

32. The suspension of claim 27 wherein said first skirt is secured between said belly pan and said first inside horizontal edge of said first auxiliary ski, and said second skirt is secured between said belly pan and said second inside horizontal edge of said second auxiliary ski.

* * * * *